United States Patent [19]
Poorman

[11] 4,025,110
[45] May 24, 1977

[54] SUSPENSION SEAT SAFETY BELT MOUNTING

[75] Inventor: R. William Poorman, Fort Wayne, Ind.

[73] Assignee: International Harvester Company, Chicago, Ill.

[22] Filed: Nov. 12, 1973

[21] Appl. No.: 415,091

[52] U.S. Cl. .............................. 297/385; 248/393; 280/744; 297/216

[51] Int. Cl.[2] ................... A62B 35/00; B60R 21/10

[58] Field of Search ............ 280/150 SB, 744–747; 297/385, 388, 389, 216; 248/393–399, 424, 429; 296/65 R, 65 A

[56] References Cited

UNITED STATES PATENTS

| 3,147,995 | 9/1964 | Bohlin | 297/385 |
| 3,170,728 | 2/1965 | Barenyi | 248/395 X |
| 3,207,554 | 9/1965 | Dall | 297/385 |
| 3,463,543 | 8/1969 | Zellar | 297/216 |
| 3,493,211 | 2/1970 | Barecki et al. | 248/399 |
| 3,582,133 | 6/1971 | DeLavenne | 297/216 X |
| 3,737,197 | 6/1973 | Hall et al. | 297/385 |
| 3,746,393 | 7/1973 | Andres et al. | 280/744 X |
| 3,811,727 | 5/1974 | Rumpel | 297/385 |

FOREIGN PATENTS OR APPLICATIONS

| 1,231,123 | 12/1966 | Germany | 297/385 |

Primary Examiner—Roy D. Frazier
Assistant Examiner—William E. Lyddane
Attorney, Agent, or Firm—Frederick J. Krubel; Floyd B. Harman

[57] ABSTRACT

A safety belt mounting structure for use in conjunction with a vehicle seat that is suspended to permit adjustment up and down, and fore and aft for passenger comfort. The structure includes a rigid link pivotally mounted to the vehicle frame and to the seat structure and adapted to absorb the kinetic energy of the passenger and seat in the event of collision or vehicle impact.

4 Claims, 8 Drawing Figures

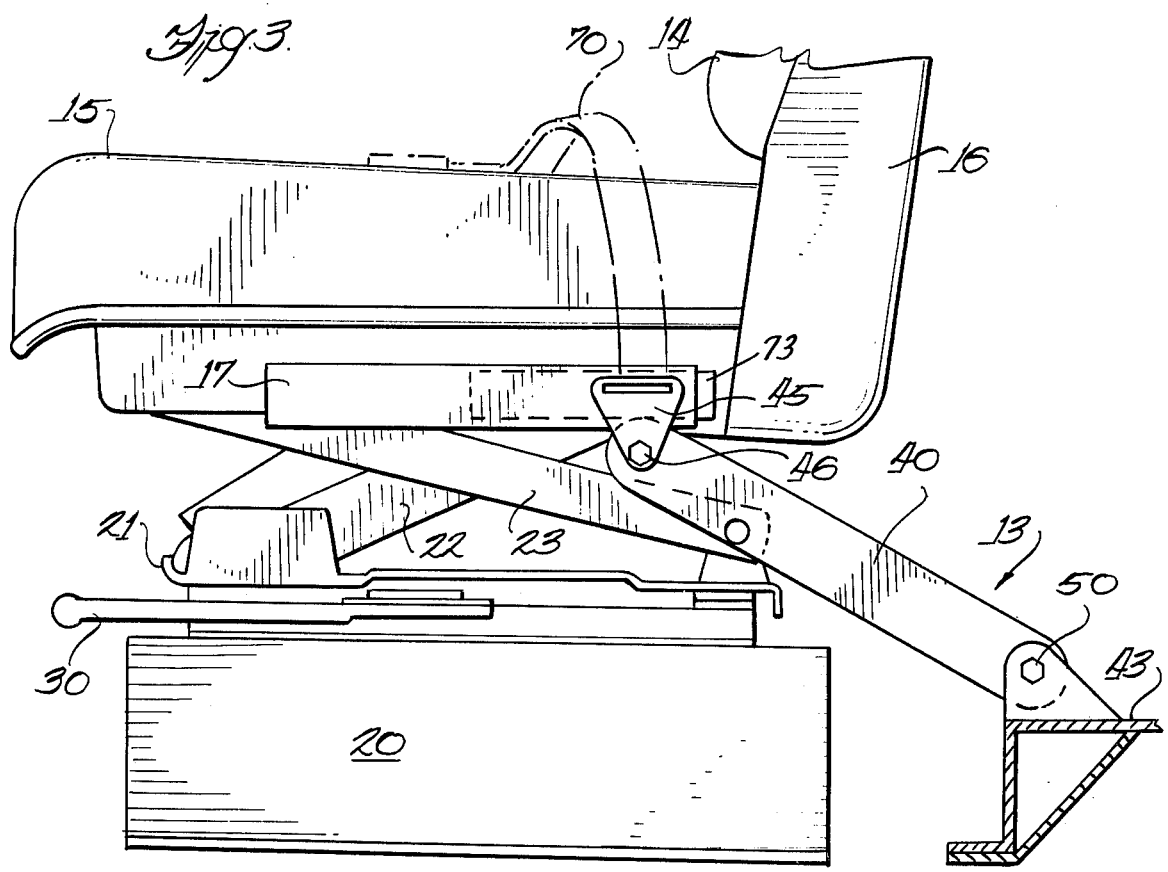
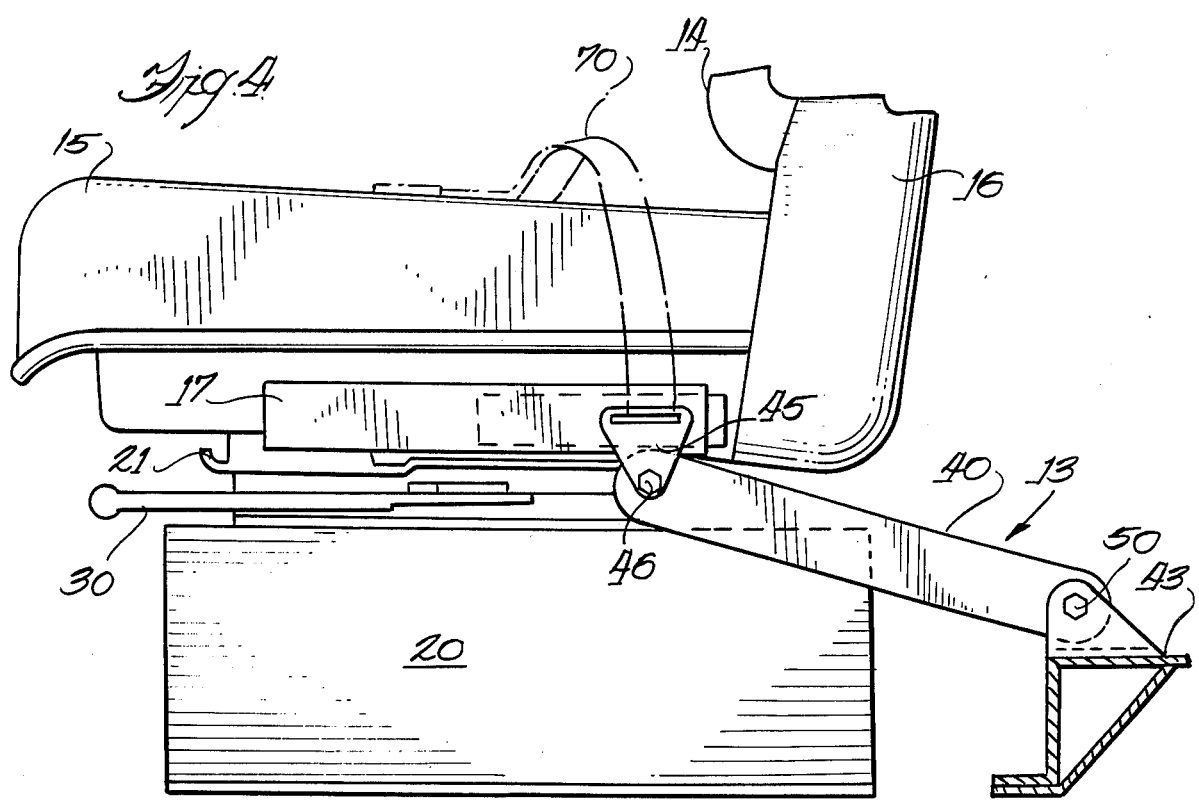

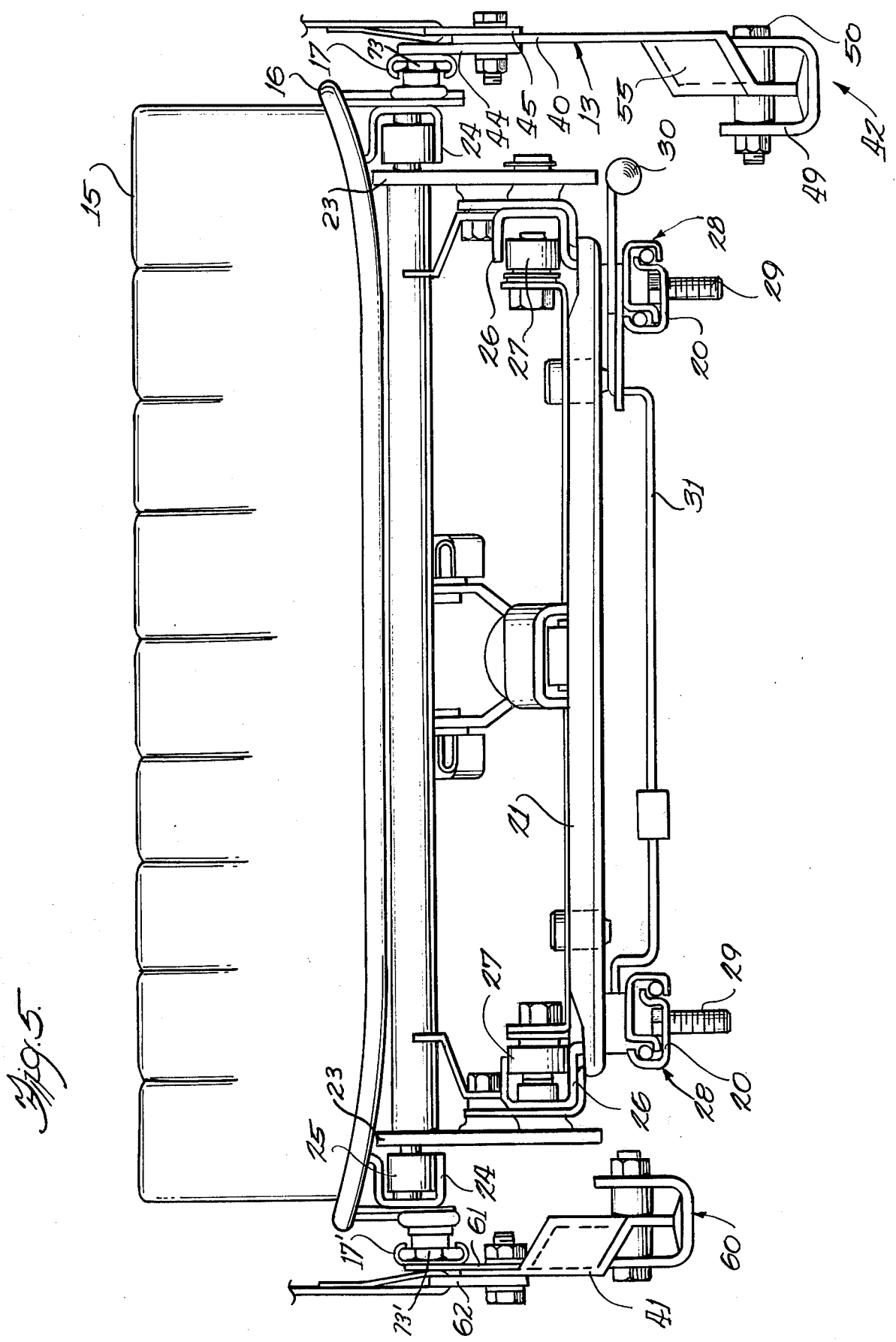

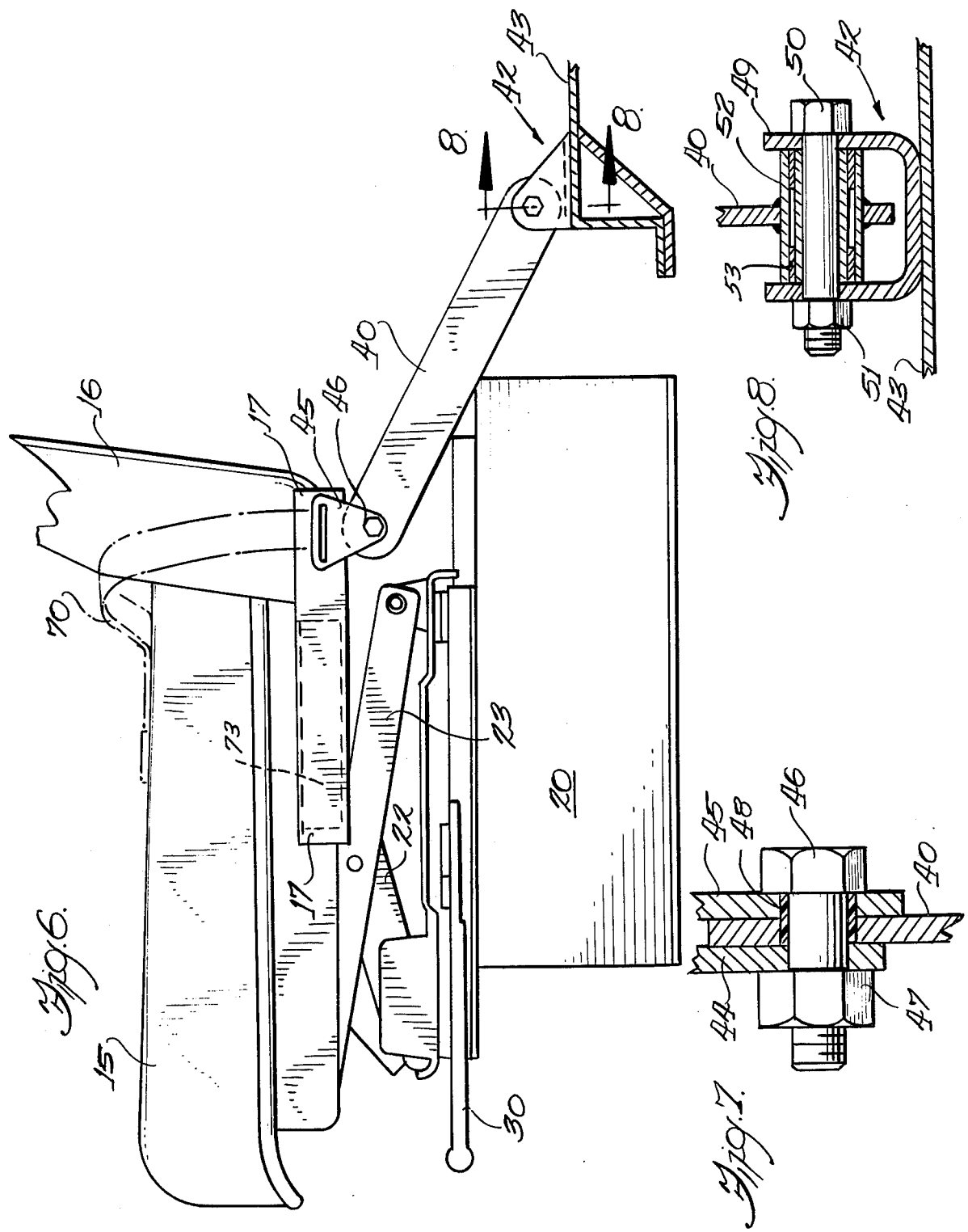

SUSPENSION SEAT SAFETY BELT MOUNTING

BACKGROUND OF THE INVENTION

The invention relates generally to the field of chairs and seats for use in moving vehicles, and more particularly to crash seats including safety restraining means to protect the occupant of such a seat.

A number of crash seat restraining devices and safety belts for use in conjunction therewith have been developed and are taught by the prior patent art. Examples of such devices are shown in the patents to DeLavenne, U.S. Pat. No. 3,582,133; to Zellar, U.S. Pat. No. 3,463,543; and to Lohr et al, U.S. Pat. No. 3,186,760. The seat structures shown in these prior patents are not "suspension" seats in that they are not adjustable up and down, as well as fore and aft.

All suspension seats have a unique problem in regard to seat safety belts, namely that the main or lap belt must be anchored to the seat structure at a point which moves vertically with the occupant cushions. Otherwise, vertical articulation of the suspension mechanism would cause the belt to loosen and tighten about the occupant through each vertical seat motion causing an uncomfortable ride.

Simple attachment of the lap belt to the seat structure above the suspension mechanism corrects the above objection but subjects the suspension mechanism to severe force loads during vehicle impact or tests simulating same.

SUMMARY OF THE INVENTION

It is an object of the present invention to provide an improved tethering linkage pivotally mounted to the vehicle frame and to a floating interconnecting point on the seat structure so as to permit vertical adjustment of the seat height and still maintain an impact absorbing anchorage to the seat structure and its passenger.

It is a more general object to provide a suspension seat anchorage that permits freedom of vertical movement of the seat and adjustment of the belt after horizontal ajustment of the seat while offering a fairly nonyielding restraint during crash kinematics.

It is a more specific object to provide a seat structure of the type described that conforms to Federal Motor Vehicle Safety Standards 207 and 210, as in effect on the date of production.

BRIEF DESCRIPTION OF THE DRAWINGS

FIG. 3 is a partial side veiw of the seat of FIG. 2 in the maximum up position;

FIG. 4 is a partial side veiw of the seat of FIG. 2 in the lowermost down position;

FIG. 5 is a front sectional veiw taken on line 5—5 of FIG. 2;

FIG. 6 is a partial side veiw of the seat of FIG. 2 in the maximum forward position;

FIG. 7 is a fragmentary, enlarged sectional view taken on line 7—7 of FIG. 2; and FIG. 8 is a fragmentary, enlarged sectional view taken on line 8—8 of FIG. 6.

DESCRIPTION OF A PREFERRED EMBODIMENT

Figure 1:
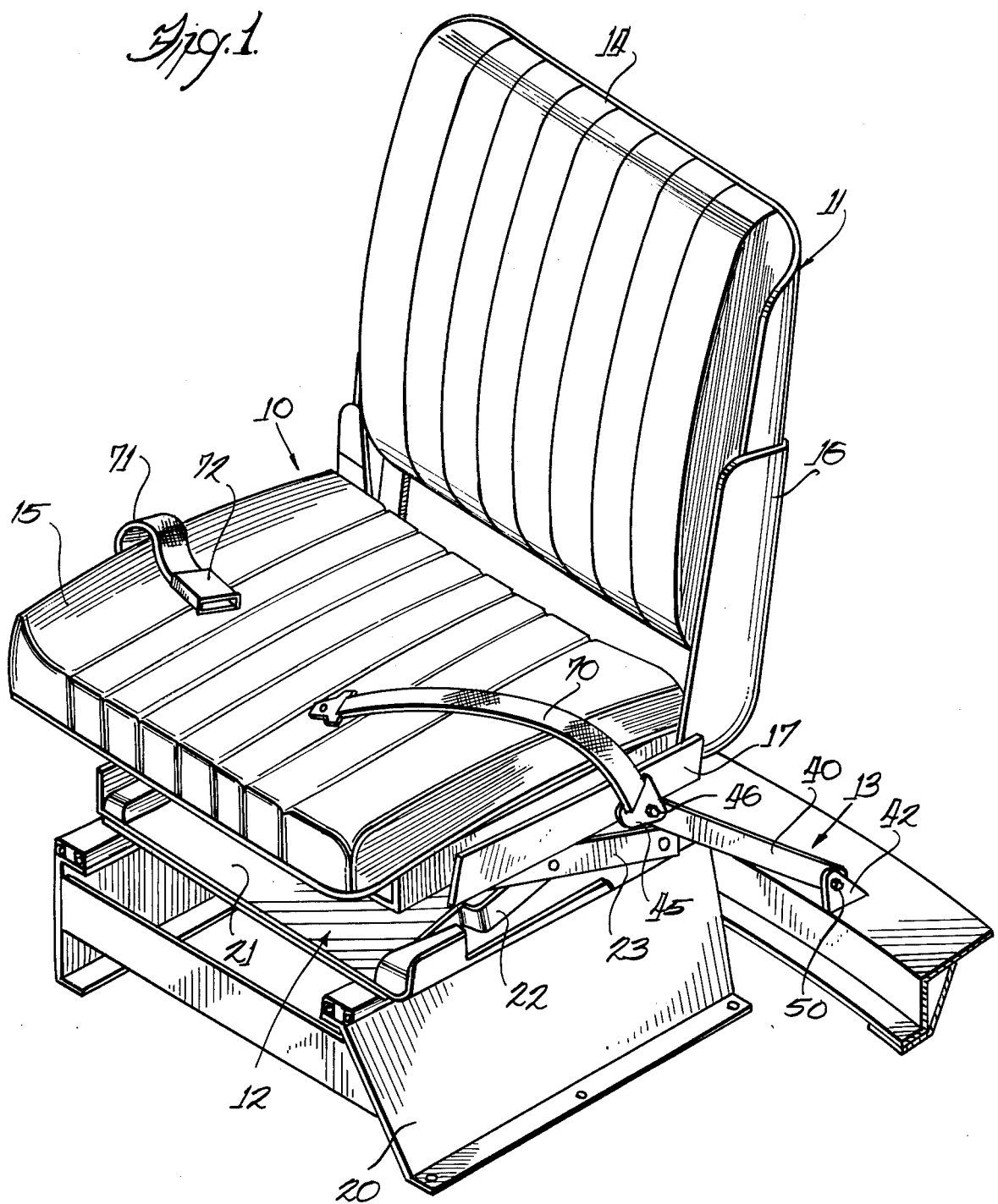
FIG. 1 is a prespective view of a suspension seat and the improved safety tethering mechanism of the present invention.

The overall suspension seat and safety mounting structure of the present invention is designated by the numeral 10. The suspension seat alone is designated by the numeral 11, its suspension mechanism by the numeral 12, and the tethering linkage by the numeral 13. The seat 11 includes a back cushion 14, a bottom cushion 15, and an upper seat supporting frame 16. The frame 16 is mounted to slide horizontally by virtue of the interengagement of slide members 73, 73' carried by the frame and a pair of floating side channels 17, 17' disposed on respective opposite sides of the frame 16. The side channels 17, 17' form a part of the tethering linkage 13.

The details of construction of the suspension mechanism 12 are not critical for an understanding of the present invention, but generally comprise a rigid or stationary base 20 mounted firmly to the vehicle floor a movable lower seat support base 21 disposed to slide horizontally over the fixed or stationary base 20, two pair of "scissor" actuated supporting brackets or links 22 and 23 on either side of the seat 12. The brackets or links 22 and 23 of each pair are pivotally connected together and are actuated by a conventional mechanism (not shown) to raise and lower the seat 11.

The suspension mechanism 12 also includes a pair of horizontal channels 24 mounted beneath the frame 16 which serve as guide rails for rollers 25 attached to the uppermost ends of the brackets 22, 23. A similar pair of horizontal channels 26 are mounted on the base 21 which serve as guide rails for rollers 27 attached to the lowermost ends of the brackets 22, 23. The movable base 21 is supported by a pair of horizontally mounted slide bearings 28, commonly known as seat adjusters, which are attached to the fixed base 20 by bolts 29.

Fore and aft adjustment of the seat 11 and suspension mechanism 12 is permitted by means of a manual release lever 30 and its associated linkage 31 connected to the seat adjusters 28. It should be noted that the linkage 31 is designed to restrain the horizontal movement of the seat 11 in several selective positions, but this linkage is not adequate to hold the seat and driver under crash conditions.

The tethering linkage 13 comprises a flat, rigid bar or link 40 on one side of the seat 11 and similar bar or link 41 on the other side. The links 40 41 are pivotally mounted at their lower ends on anchors 42 rigidly attached to a frame member 43 or other study portion of the vehicle. The upper end of the link 40 is pivotally attached to a seat belt anchor support means or connecting link 44 which is rigidly attached to the channel 17. A seat belt attachment link 45 is also connected to the link 40 and anchor support means 44 by means of a bolt 46 and nut 47, as best shown in FIG. 7. Referring to the enlarged sectional view of FIG. 7, a bushing 48 surrounding the bolt 46 may also be provided to permit easy angular motion of the links 40 and 45 about the bolt 46.

Referring to the enlarged sectional view of FIG. 8, the mounting anchor 42 is seen to comprise a generally U-shaped member 49 bolted or otherwise rigidly attached to the frame member 43 and a bolt 50 and nut 51. A transverse cylindrical sleeve 52 is welded to the link 40 and surrounds the bolt 50. A bushing or bearing 53 may also be provided between the bolt 50 and sleeve 52 to allow free rotation about the bolt 50 in the vertical plane defined by the link 40. The link 40 may be formed with an angular off-set portion 55, as shown in FIG. 5 to facilitate mounting of the anchor 42 beneath or behind the seat 11, or to facilitate the use of existing seat belt anchorage fittings or brackets on the cab frame member 43.

The link 41 on the opposite side of the seat 11 (similar to link 40) is pivotally mounted on an anchor 60 and has its opposite end pivotally connected to a connecting link or seat belt anchor support means 61 which, in turn is rigidly attached to the channel 17. A seat belt attachment link 62 is also pivotally attached to the link 41. The anchor 60 for the link 41 is shown in FIG. 7 as somewhat elevated with respect to the anchor 42 because of the drive line tunnel through the vehicle cab.

One end of a seat belt 70 is firmly attached to the link 45, and the other end 71 is firmly attached to the link 62. The two ends may be attached together around the vehicle passenger by means of a buckle 72 or other clasp that meets the Federal Motor Vehicle Safety Standards.

Figure 2:
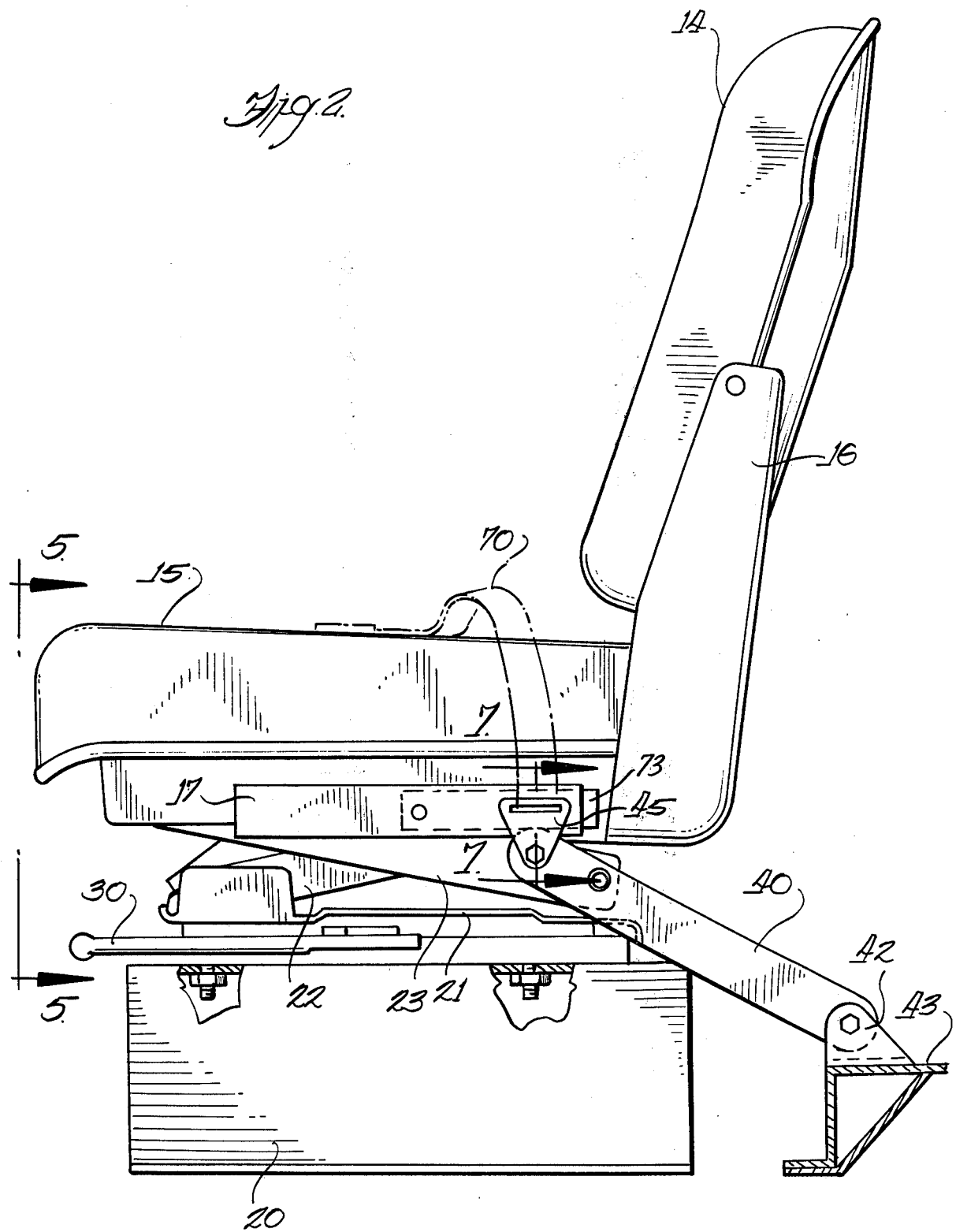
FIG. 2 is a side view, partially cut-away, of the suspension seat in a mid-position.

In operation, the tethering linkage 13 of the present invention is used as follows:

The driver or passenger occupying the seat should select the desired horizontal position of the seat 11 before connecting the seat belts 70 and 71, as in any conventional vehicle. Fore adjustment and aft adjusstment of the seat frame 16 will have no effect on the position of the connecting links 44, 61 and guide channel 17, 17'. The belt sections 70 and 71 are then connected together and adjusted to the desired amount. The seat suspension mechanism 12 may then be used to adjust the vertical height of the seat 11 without altering this belt adjustment. As the seat 11 is raised or lowered, as shown in FIGS. 2, 3 and 4, the links 40 and 41 pivot about their respective anchors, but there is no, or only insignificant, relative change in the tautness of the belt.

Under crash conditions, the rigid links 40 and 41 provide a solid restraining anchor for the seat belt against the forward motion of the passenger. The restraining force may amount to several thousand pounds under extreme impact conditions. There is no slack to be taken up before the restraining force becomes effective.

The tethering mechanism of the present invention is seen to provide a safety restraining means that is always available when needed, but which does not interfere in any way with the adjustment of the seat for passenger comfort under normal driving conditions.

It is to be understood that many modifications may be made to the present embodiment without departing from the spirit of the invention. The invention is not to be construed as limited to the embodiment shown and described except insofar as the claims may be so limited.

What is claimed is:

1. A seat belt anchor mechanism for pivotally anchoring one end of a seat belt to each side of a suspension seat having an upper seat support frame movable vertically and horizontally relative to a lower seat frame and to the floor of a vehicle to which the lower seat frame is adapted to be fastened, characterized in that said anchor mechanism comprises:

slide means including a guide member and a slide member slidable on said guide member;

one of said members being fixed to said upper seat support frame and the other of said members being pivotally connected by a rearwardly and downwardly directed rigid pivot link to the vehicle frame at a pivot point behind the seat;

and seat belt anchor support means integral with said other of said members and movable therewith;

said anchor support means being movable vertically in response to up and down movements of said upper seat support frame but remaining stationary relative to the lower seat support frame in response to horizontal fore and aft adjustment movements of said seat support frame; and the pivot links on each side of said seat being positioned so as to receive all of the loading imparted to the seat belt by an occupant and transmit it to the vehicle frame.

2. A seat belt anchor mechanism in accordance with claim 1 wherein said guide member is elongated and is longer than said slide member.

3. A seat belt anchor mechanism in accordance with claim 2 wherein said slide member is mounted on said upper seat support frame.

4. A seat belt anchor mechanism in accordance with claim 3 wherein said pivot link is mounted to said vehicle floor by a bracket to which it is pivotally mounted.

* * * * *